United States Patent [19]
Amit

[11] Patent Number: 6,005,873
[45] Date of Patent: Dec. 21, 1999

[54] APPARATUS AND METHOD FOR CONCURRENT VOICE AND DATA TRANSMISSION

[75] Inventor: Chen Amit, Tel Aviv, Israel

[73] Assignee: ECI Telecom Ltd., Petah Tikva, Israel

[21] Appl. No.: 09/140,827

[22] Filed: Aug. 26, 1998

[30] Foreign Application Priority Data

Aug. 27, 1997 [IL] Israel ........................................ 121643

[51] Int. Cl.⁶ .................................................... H04J 1/00
[52] U.S. Cl. ............................................ 370/494; 370/494
[58] Field of Search ................................... 370/493, 494, 370/495

[56] References Cited

U.S. PATENT DOCUMENTS

| | | | |
|---|---|---|---|
| 4,985,891 | 1/1991 | Fujiwara et al. | 370/110.1 |
| 5,410,343 | 4/1995 | Coddington et al. | 348/7 |
| 5,461,616 | 10/1995 | Suzuki | 370/79 |
| 5,559,858 | 9/1996 | Beveridge | 379/56 |
| 5,608,447 | 3/1997 | Farry et al. | 348/7 |
| 5,623,543 | 4/1997 | Cook | 379/402 |
| 5,627,501 | 5/1997 | Biran et al. | 333/17.1 |
| 5,757,803 | 5/1998 | Russell et al. | 370/494 |
| 5,781,617 | 7/1998 | McHale et al. | 379/93.14 |
| 5,815,505 | 9/1998 | Mills | 370/522 |
| 5,848,150 | 12/1998 | Bingel | 379/399 |

FOREIGN PATENT DOCUMENTS

| | | |
|---|---|---|
| 325794 | 8/1989 | European Pat. Off. . |
| 325794 | 3/1995 | European Pat. Off. . |
| 740451 | 10/1996 | European Pat. Off. . |
| 6311128 | 11/1994 | Japan . |
| 7074846 | 3/1995 | Japan . |

OTHER PUBLICATIONS

George T. Hawley, "Systems Considerations for the Use of xDSL Technology for Data Access", IEEE Communications Magazine, pp. 56–60, Mar. 1997.

*Primary Examiner*—Melvin Marcelo
*Attorney, Agent, or Firm*—Abelman, Frayne & Schwab

[57] ABSTRACT

Communication apparatus comprising a first xDSL transceiver for conveying an xDSL transmission, a splitter for conveying a POTS transmission via a POTS telephone line and the xDSL transmission via an xDSL telephone line, and a second xDSL transceiver being in communication with the first xDSL transceiver and the splitter.

17 Claims, 2 Drawing Sheets

APPARATUS AND METHOD FOR CONCURRENT VOICE AND DATA TRANSMISSION

FIELD OF THE INVENTION

The present invention relates to telecommunication systems in general, and in particular to methods and apparatus for concurrent voice and data telecommunication over a single medium.

BACKGROUND OF THE INVENTION

Plain old telephone service (POTS), the standard telephone service that most homes that are connected to a public switched telephone network (PSTN) use, is not generally used for concurrent transmission of voice and data, as it is currently limited to transmission rates of up to 56.6 kbit/s.

Technologies such as digital subscriber line (xDSL) services are being developed to allow data, voice, and video to be transmitted simultaneously over standard twisted-pair copper wire telephone lines at multimegabit rates. xDSL is seen as an alternative to the more costly and time-consuming installation of high-speed fiber-based broadband communications networks.

Competing xDSL technologies include ADSL, RADSL, HDSL, SDSL, and VDSL. Each is best suited to a different application, with trade-offs made between signal distance and speed and with each having different transmission bandwidth configurations.

Asymmetric digital subscriber line (ADSL) is perhaps the best known xDSL variant, providing more transmission bandwidth "downstream" to a telephone subscriber than "upstream" from the subscriber. Downstream transmission rates range between 1.5 Mbit/s to a theoretical 8 Mbit/s, while upstream transmission rates range between 16 kbit/s to a theoretical 1 Mbit/s or more, each depending on line quality, distance, and wire gauge. Depending on environmental conditions, ADSL can transmit data at a rate of 1.544 Mbit/s over distances of up to 6,000 m using standard 24-gauge wire, and 8 Mbit/s over distances of 4,000 m or less. ADSL works by sending digital pulses in the high-frequency area of telephone wires. Since these high frequencies are not used by normal voice communications, ADSL can operate concurrently with voice communication over the same telephone wires.

Very-high-bit-rate digital subscriber line (VDSL) is the fastest xDSL technology. It can deliver downstream transmissions at a rate of 13 to 52 Mbit/s and upstream transmissions at a rate of 1.5 to 2.3 Mbit/s over a single wire pair. Unfortunately, VDSL has a maximum operating distance of only 300–1,500 m.

In digital subscriber line access multiplexing (DSLAM) telephone carriers join and split voice and data transmissions, employing digital subscriber line access multiplexers to send and receive these transmissions to/from subscribers over standard telephone lines using ADSL modems. Line or POTS splitters at the carrier alternately divide upstream ADSL transmissions, directing voice communications onto the public switched network and data streams to service providers such as Internet Service Providers (ISPs), and join voice and data streams for downstream transmission. A POTS splitter at the subscriber's location similarly joins and splits ADSL transmissions, with voice transmissions terminating at a telephone or other POTS apparatus and data transmissions terminating at an ADSL modem DSLAM is disadvantageous in that it is relatively expensive, generally requires professional installation of the POTS splitter at the subscriber's location and rewiring of the subscriber's telephone outlets to accommodate simultaneous data and voice transmissions, and is largely incompatible with future VDSL and "Fiber to the Curb" (FTTC) systems now being planned.

SUMMARY OF THE INVENTION

The present invention seeks to provide novel apparatus and methods for providing xDSL service to subscribers. The present invention provides an improved system which overcomes disadvantages of the prior art as discussed above. A communications system is provided wherein voice and data transmissions are joined remotely from a telephone carrier at a substation situated near one or more subscribers. A modified xDSL carrier accommodates data transmissions for one or more subscribers while simultaneously powering the substation, all over standard telephone wires. The substation then multiplexes the xDSL transmissions and transmits them to the subscribers.

Embodiments of the present invention are advantageous over the prior art in some or all of the following respects:

a) one xDSL line connecting the telephone carrier and the substation may be used to accommodate high-speed transmissions for multiple subscribers;

b) rewiring a subscriber's home telephone network is not required;

c) a very simple low pass filter may be used to connect a telephone or other POTS apparatus to the incoming xDSL transmission at the telephone jack and does not require professional installation;

d) digital pair gain devices, digital loop carriers, and remote switching units may be used in parallel to xDSL transmission;

e) the overall distance over copper wire is increased by approximately 1 Km;

f) a greater number of subscribers may be accommodated using the same rack space as in the prior art;

g) the power consumption per subscriber is reduced; and h) the substation does not require a local power source as it receives power from the central office via standard telephone wires.

There is thus provided in accordance with a preferred embodiment of the present invention communication apparatus including a first xDSL transceiver for conveying an xDSL transmission, a splitter for conveying a POTS transmission via a POTS telephone line and the xDSL transmission via an xDSL telephone line, and a second xDSL transceiver being in communication with the first xDSL transceiver and the splitter.

Further in accordance with a preferred embodiment of the present invention the first xDSL transceiver includes a plurality of first xDSL transceivers and the communication apparatus further includes inverse multiplexing apparatus in communication with any of the plurality of first xDSL transceivers.

Still further in accordance with a preferred embodiment of the present invention remote powering apparatus is included for receiving power over a standard telephone line.

Moreover in accordance with a preferred embodiment of the present invention the standard telephone line is operative to convey the xDSL transmission.

Additionally in accordance with a preferred embodiment of the present invention the splitter includes a plurality of splitters and the communication apparatus further including POTS multiplexing apparatus in communication with the plurality of splitters.

Further in accordance with a preferred embodiment of the present invention the POTS multiplexing apparatus receives a combined POTS transmission of a plurality of POTS transmissions and multiplexingly communicates the plurality of POTS transmissions via the plurality of splitters.

Still further in accordance with a preferred embodiment of the present invention the POTS multiplexing apparatus includes digital pair gain apparatus.

Additionally in accordance with a preferred embodiment of the present invention the POTS multiplexing apparatus includes digital loop carrier apparatus.

Moreover in accordance with a preferred embodiment of the present invention the POTS multiplexing apparatus includes remote switching unit apparatus.

There is additionally provided in accordance with a preferred embodiment of the present invention a communication system including a remote xDSL transceiver, a PSTN switch, and a substation in communication with the remote xDSL transceiver via at least one xDSL telephone line and the PSTN switch via at least one POTS telephone line, the substation including a first xDSL transceiver for communicating in at least one direction an xDSL transmission via the at least one xDSL telephone line, a second xDSL transceiver for communicating in at least one direction the xDSL transmission with the first xDSL transceiver, and a splitter for communicating in at least one direction a POTS transmission via the at least one POTS telephone line and the xDSL transmission with the second xDSL transceiver.

Further in accordance with a preferred embodiment of the present invention at least one subscriber telephone line is included.

Still further in accordance with a preferred embodiment of the present invention the splitter communicates in at least one direction via the at least one subscriber telephone line.

Additionally in accordance with a preferred embodiment of the present invention the at least one subscriber telephone line includes a plurality of subscriber telephone lines and the substation multiplexingly communicates via the plurality of subscriber telephone lines.

Moreover in accordance with a preferred embodiment of the present invention a low pass filter is included for communication with the substation via the subscriber telephone line.

Further in accordance with a preferred embodiment of the present invention POTS apparatus is included for communication via the low pass filter.

Still further in accordance with a preferred embodiment of the present invention the communication between the remote xDSL transceiver and the substation uses ADSL protocol.

Additionally in accordance with a preferred embodiment of the present invention any of the transmissions via the subscriber telephone line uses either of ADSL protocol and VDSL protocol.

Moreover in accordance with a preferred embodiment of the present invention any of the telephone lines are twisted pair telephone lines.

There is additionally provided in accordance with a preferred embodiment of the present invention a communication method including transmitting at least one xDSL transmission to a remote substation via at least one xDSL telephone line, transmitting at least one POTS transmission to the remote substation via at least one POTS telephone line, and combining the at least one xDSL transmission and the at least one POTS transmission at the remote substation using at least one splitter.

There is additionally provided in accordance with a preferred embodiment of the present invention a communication method including transmitting a plurality of xDSL transmissions bound for a plurality of subscribers to a remote substation via at least one xDSL telephone line, transmitting a plurality of POTS transmissions bound for the plurality of subscribers to the remote substation via at least one POTS telephone line, combining any of the plurality of xDSL transmissions and any of the plurality of POTS transmissions at the remote substation to form a combined transmission using at least one splitter, and multiplexingly communicating the combined transmission to any of the plurality of subscribers.

There is additionally provided in accordance with a preferred embodiment of the present invention communications apparatus including:

at least one xDSL transceiver located externally of a subscriber's premises;

a standard telephone line connecting the at least one xDSL transceiver directly to a subscriber's premises telephone network;

at least one xDSL transceiver located at a subscriber's premises, coupled to the subscriber's premises telephone network; and at least one telephone located at a subscriber's premises, coupled to the subscriber's premises telephone network.

Preferably, the subscriber's premises telephone network consists of a subscriber's existing home telephone network and does not require rewiring thereof.

In accordance with a preferred embodiment of the present invention the apparatus also includes a low pass filter connecting a telephone at a telephone jack to the xDSL transceiver via the standard telephone line and the subscriber's premises telephone network.

There is additionally provided in accordance with a preferred embodiment of the present invention a method of providing xDSL communications for a subscriber's premises including:

providing at least one xDSL transceiver externally of a subscriber's premises;

connecting via a standard telephone line the at least one xDSL transceiver directly to a subscriber's premises telephone network;

coupling at least one xDSL transceiver located at a subscriber's premises to the subscriber's premises telephone network; and coupling at least one telephone located at a subscriber's premises to the subscriber's premises telephone network.

In accordance with a preferred embodiment of the present invention provision of xDSL communication to the subscriber's premises telephone network does not require rewiring thereof.

Preferably, the method also includes connecting at a telephone jack a low pass filter between a telephone and the subscriber's premises telephone network.

It is noted that throughout the specification and claims the term "POTS apparatus" includes telephones, modems, and other apparatus connectable to a PSTN for low-frequency voice and/or data communication therethrough.

It is further noted that throughout the specification and claims the terms "telephone line," "telephone cable," and "telephone wire" are used interchangeably and refer to the physical medium for conveying voice, data, and video transmissions common to POTS service, typically comprising one or two pairs of twisted wires.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

Figure 1:
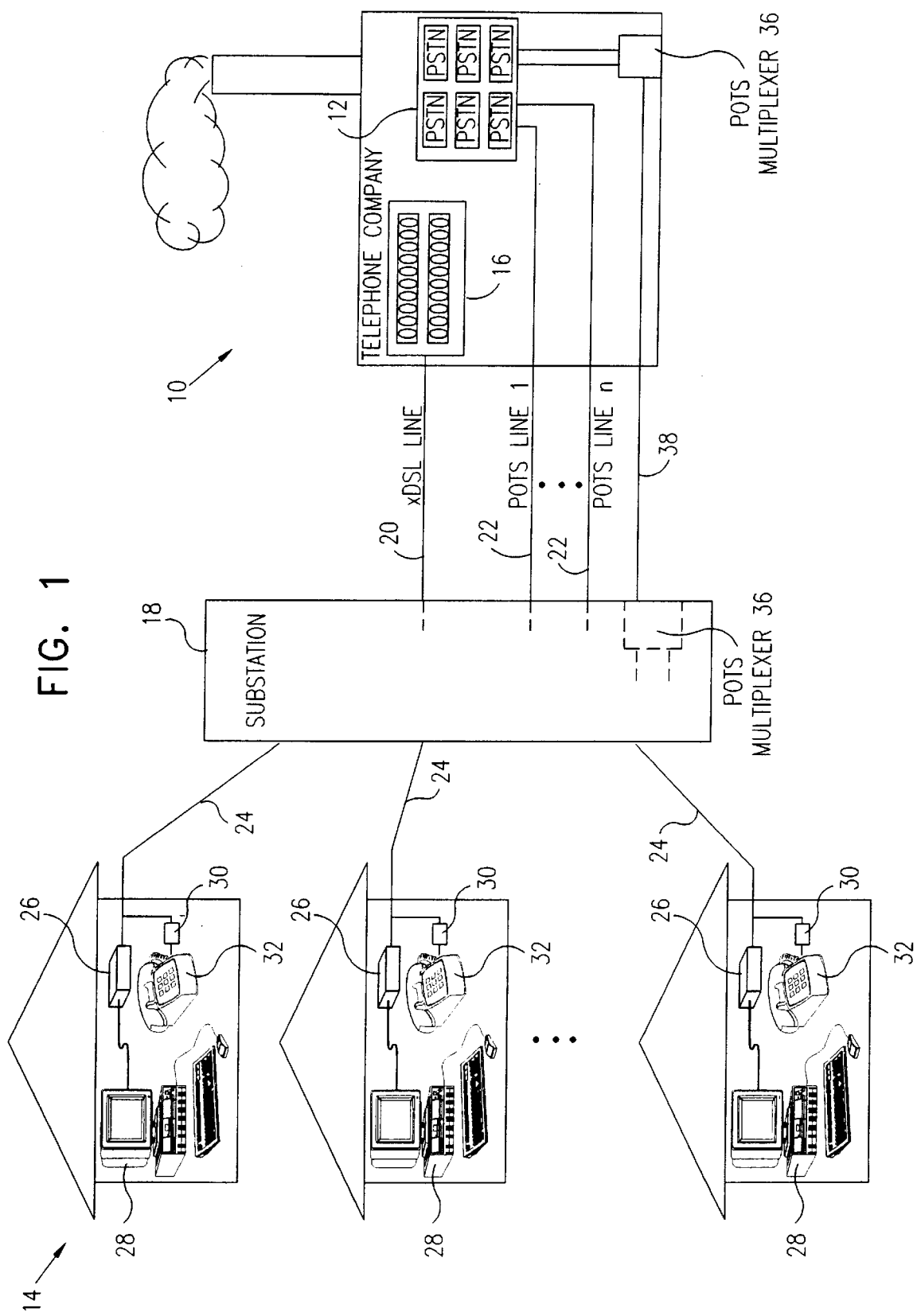
FIG. 1 is a simplified block diagram of a communication system constructed and operative in accordance with a preferred embodiment of the present invention.

Reference is now made to FIG. 1 which is a simplified block diagram of a communications system constructed and operative in accordance with a preferred embodiment of the present invention. Shown is a service provider 10, typically a telephone company, being preferably configured with one or more PSTN switches 12 for providing POTS service to one or more subscribers 14. Service provider 10 is also preferably configured with one or more transceivers 16, typically ATU-C units or other known xDSL modems, for providing high-speed transmissions to subscribers 14. A substation 18 is located near subscribers 14, typically within 500 to 1000 meters of each subscriber 14. Substation 18 is in communication with transceiver 16, typically over one or more standard telephone lines 20, referred to herein as xDSL lines 20. It is a particular feature of the present invention that xDSL line 20 is used for high-speed transmissions between substation 18 and transceiver 16, such as ADSL transmissions, and that xDSL line 20 may additionally or alternatively be used to provide power to substation 18. Powering is preferably provided over xDSL line 20 by using the low frequency bandwidth of xDSL line 20 for power instead of POTS transmissions. Substation 18 is also typically in communication with PSTN switch 12 for POTS transmissions over one or more standard telephone lines 22, referred to herein as POTS lines 22. Substation 18 is also in communication with subscribers 14, typically over one or more standard telephone lines 24. Subscriber 14 typically has one or more transceivers 26, each typically being an xDSL modem capable of accommodating ADSL or VDSL transmissions, connecting telephone line 24 with devices such as a computer 28. Subscriber 14 also typically has one or more low pass filters 30, each connecting telephone line 24 with POTS apparatus such as a telephone 32 and filtering out high-frequency transmissions from low-frequency POTS transmissions. It is appreciated that low pass filter 30 need not be required should the unfiltered quality of the POTS transmission either to or from POTS apparatus not warrant filtering.

Typical operation of the communications system of FIG. 1 is described as follows. One or more high-speed transmissions bound for one or more subscribers 14 are transmitted by transceiver 16 over xDSL line 20 to substation 18 together with power for substation 18. The high-speed transmissions are typically sent using an ADSL modem (not shown). One or more POTS transmissions are also transmitted by PSTN switch 12 over POTS lines 22 to substation 18. Substation 18 then joins incoming high-speed transmissions with POTS transmissions and multiplexes each transmission over telephone lines 24 to the appropriate subscriber 14 for which the transmission is destined. Transmissions over telephone lines 24 are typically sent using a VDSL modem (not shown), although any xDSL protocol appropriate to the distance between substation 18 and subscribers 14, including ADSL, may be used. Subscriber 14 receives the high-speed transmission from telephone line 24 at transceiver 26 where it may be directed to computer 28. Subscriber 14 receives the POTS transmission from telephone line 24 where any high-frequency transmissions are filtered out at low pass filter 30. Any low-frequency POTS transmissions may then be directed to telephone 32. Transmissions originating from subscriber 14 are received at substation 18 and split into high-speed transmissions for routing over xDSL line 20 and POTS transmissions for routing over POTS line 22.

It is appreciated that inverse multiplexing may be employed where multiple xDSL lines 20 are used for high-speed transmissions between transceiver 16 and substation 18.

The configuration of the communications system of FIG. 1 may additionally provide for POTS multiplexing devices 36 such as digital pair gain devices, digital loop carriers, and remote switching units for joining and splitting multiple POTS lines at service provider 10 and substation 18 for transmission over a single communications medium 38. Communications medium 38 may be a standard POTS telephone line, HDSL, fiber optic, or other medium as appropriate for use with devices 36 as is known in the art.

Figure 2:
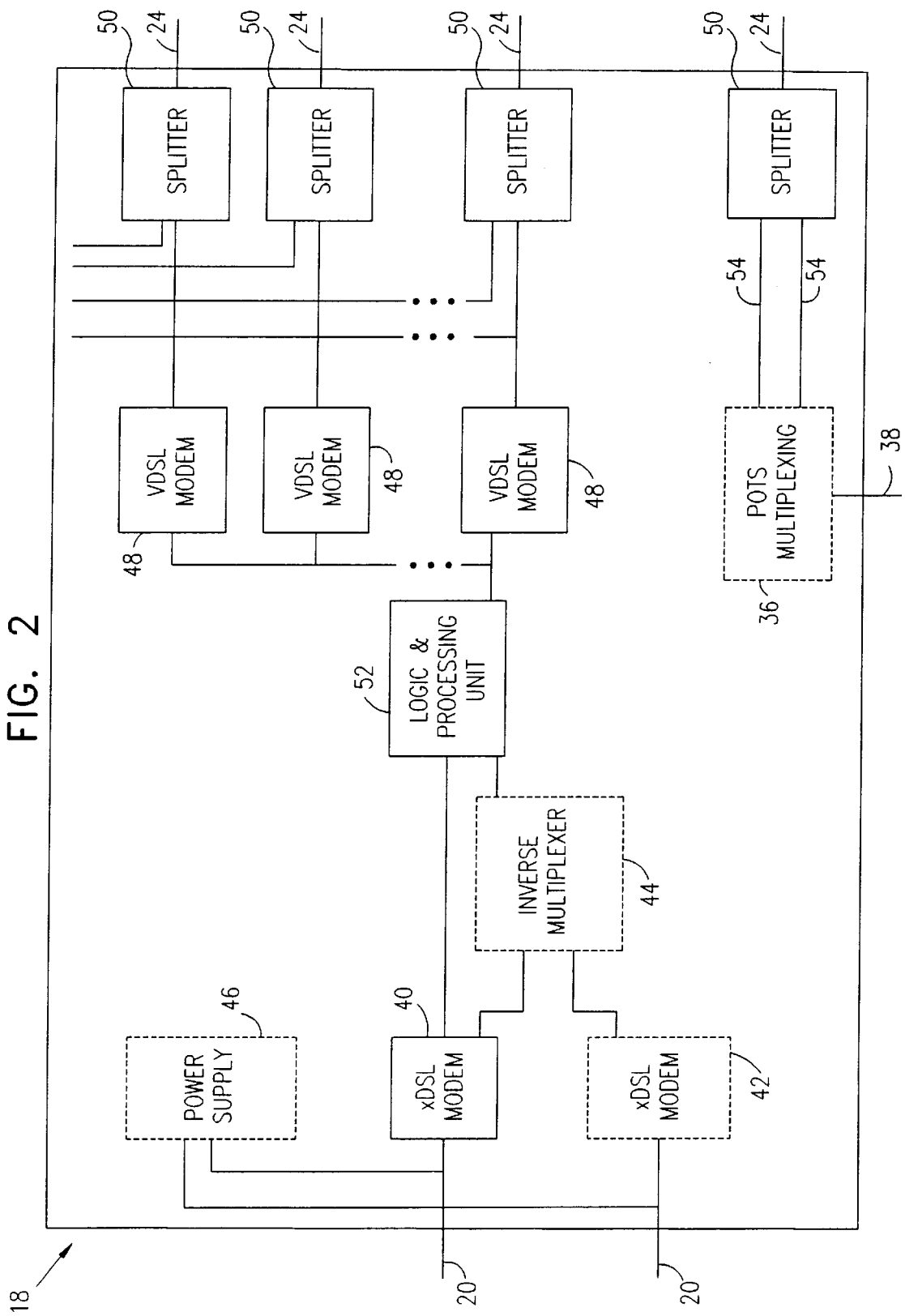
FIG. 2 is a simplified block diagram of apparatus used in the communication system of FIG. 1 constructed and operative in accordance with a preferred embodiment of the present invention.

Reference is additionally made to FIG. 2 which is a simplified block diagram of substation 18 of FIG. 1 constructed and operative in accordance with a preferred embodiment of the present invention. Shown is an xDSL modem 40, typically an ADSL modem, for communicating xDSL transmissions via xDSL line 20. One or more additional xDSL modems 42 may be provided to accommodate additional xDSL lines which may optionally be combined using inverse multiplexer 44 as is known. A power supply 46 is optionally provided where powering is received via xDSL line 20 as described hereinabove. One or more xDSL modems 48, typically VDSL modems, are provided for communicating xDSL transmissions to subscribers via telephone lines 24, typically through one or more provided splitters 50. POTS multiplexing devices 36 are also shown splitting a combined POTS transmission received via communications medium 38 into multiple POTS transmissions 54. A logic and processing unit 52 is provided for controlling one or more of the components described hereinabove as is known in the art.

It is appreciated that any of the components of the present invention may be implemented in computer or other electronic, mechanical, or other electromechanical hardware, software, or any suitable combination using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. Communication apparatus comprising:
   a first xDSL transceiver for conveying an xDSL transmission;
   a splitter for conveying a POTS transmission via a POTS telephone line and said xDSL transmission via an xDSL telephone line; and a second xDSL transceiver being in communication with said first xDSL transceiver and said splitter, and wherein
said first xDSL transceiver comprises a plurality of first xDSL transceivers; and wherein
said communication apparatus further comprises:
inverse multiplexing apparatus in communication with any of said plurality of first xDSL transceivers.

2. Communication apparatus according to claim 1 and further comprising remote powering apparatus for receiving power over a standard telephone line.

3. Communication apparatus according to claim 2 wherein said standard telephone line is operative to convey said xDSL transmission.

4. A communication system according to claim 1 wherein any of said telephone lines are twisted pair telephone lines.

5. Communication apparatus comprising:
a first xDSL transceiver for conveying an xDSL transmission;
a splitter for conveying a POTS transmission via a POTS telephone line and said xDSL transmission via an xDSL telephone line; and
a second xDSL transceiver being in communication with said first xDSL transceiver and said splitter wherein said splitter comprises a plurality of splitters and wherein said communication apparatus further comprises POTS multiplexing apparatus in communication with said plurality of splitters.

6. Communication apparatus according to claim 5 wherein said POTS multiplexing apparatus receives a combined POTS transmission of a plurality of POTS transmissions and multiplexingly communicates said plurality of POTS transmissions via said plurality of splitters.

7. Communication apparatus according to claim 5 wherein said POTS multiplexing apparatus comprises digital pair gain apparatus.

8. Communication apparatus according to claim 5 wherein said POTS multiplexing apparatus comprises digital loop carrier apparatus.

9. Communication apparatus according to claim 5 wherein said POTS multiplexing apparatus comprises remote switching unit apparatus.

10. A communication system comprising:
a remote xDSL transceiver;
a PSTN switch; and
a substation in communication with said remote xDSL transceiver via at least one xDSL telephone line and said PSTN switch via at least one POTS telephone line, wherein said substation comprises:
a first xDSL transceiver for communicating in at least one direction an xDSL transmission via said at least one xDSL telephone line;
a second xDSL transceiver for communicating in at least one direction said xDSL transmission with said first xDSL transceiver; and
a splitter for communicating in at least one direction a POTS transmission via said at least one POTS telephone line and said xDSL transmission with said second xDSL transceiver.

11. A communication system according to claim 10 and further comprising at least one subscriber telephone line.

12. A communication system according to claim 11 wherein said splitter communicates in at least one direction via said at least one subscriber telephone line.

13. A communication system according to claim 11 wherein said at least one subscriber telephone line comprises a plurality of subscriber telephone lines and wherein said substation multiplexingly communicates via said plurality of subscriber telephone lines.

14. A communication system according to claim 11 and further comprising a low pass filter for communication with said substation via said subscriber telephone line.

15. A communication system according to claim 14 and further comprising POTS apparatus for communication via said low pass filter.

16. A communications communications to claim 10 wherein communication between said remote xDSL transceiver and said substation uses ADSL protocol.

17. A communications system according to claim 11 wherein any of said transmissions via said subscriber telephone line uses either of ADSL protocol and VDSL protocol.

* * * * *